United States Patent
Kershaw et al.

(10) Patent No.: US 7,506,091 B2
(45) Date of Patent: Mar. 17, 2009

(54) INTERRUPT CONTROLLER UTILISING PROGRAMMABLE PRIORITY VALUES

(75) Inventors: Daniel Kershaw, Cambridge (GB); Richard Roy Grisenthwaite, Cambridge (GB); Stuart David Biles, Suffolk (GB); David Hennah Mansell, Cambridge (GB)

(73) Assignee: ARM Limited, Cambridge (GB)

( * ) Notice: Subject to any disclaimer, the term of this patent is extended or adjusted under 35 U.S.C. 154(b) by 134 days.

(21) Appl. No.: 11/603,091

(22) Filed: Nov. 22, 2006

(65) Prior Publication Data

US 2007/0143515 A1 Jun. 21, 2007

(30) Foreign Application Priority Data

Dec. 21, 2005 (GB) ................. 0526007.0

(51) Int. Cl.
*G06F 13/26* (2006.01)
*G06F 13/24* (2006.01)
*G06F 13/32* (2006.01)

(52) U.S. Cl. .................. 710/266; 710/265; 710/261
(58) Field of Classification Search ............ 710/264, 710/265, 266, 261
See application file for complete search history.

(56) References Cited

U.S. PATENT DOCUMENTS

| | | | |
|---|---|---|---|
| 5,083,261 A | | 1/1992 | Wilkie |
| 5,506,997 A | | 4/1996 | Maguire et al. |
| 5,918,057 A | * | 6/1999 | Chou et al. ............. 710/260 |
| 6,219,743 B1 | | 4/2001 | Kennel et al. |
| 6,742,065 B1 | * | 5/2004 | Suh ........................ 710/260 |
| 7,117,284 B2 | * | 10/2006 | Watt et al. ............... 710/261 |
| 7,120,718 B2 | * | 10/2006 | Pezzini ................... 710/265 |
| 2003/0172215 A1 | | 9/2003 | Franke et al. |
| 2003/0204655 A1 | * | 10/2003 | Schmisseur et al. ..... 710/260 |
| 2004/0153593 A1 | * | 8/2004 | Watt et al. .............. 710/200 |
| 2005/0078694 A1 | | 4/2005 | Oner |

FOREIGN PATENT DOCUMENTS

| | | |
|---|---|---|
| EP | 1 063 594 A3 | 1/2002 |
| GB | 2 360 612 A | 9/2001 |

OTHER PUBLICATIONS

T. Alves et al, "TrustZone: Integrated Hardware and Software Security" ARM White Paper, Jul. 2004, pp. 1-12.
UK Search Report for GB0526007.0, date of search Mar. 2, 2006.

* cited by examiner

*Primary Examiner*—Paul R Myers
*Assistant Examiner*—Ryan M Stiglic
(74) *Attorney, Agent, or Firm*—Nixon & Vanderhye P.C.

(57) ABSTRACT

An interrupt controller 2 is provided with priority registers 6 storing priority values P0-P9 used to determine prioritisation between received interrupt signals $I_0$-$I_9$. A priority value accessing circuit 10 provides multiple mappings to the priority values stored in dependence upon the priority value manager 16, 18, seeking to make an access. In this way, a first priority value manager 18, such as a secure operating system, can be given exclusive access to the highest priority values whilst a second priority value manager 16, such as a non-secure operating system, can be given access to a range of priority values as stored which are of a lower priority and yet as written or read by the non-secure operating system appear to the non-secure operating system to have a different, such as higher, priority level.

29 Claims, 4 Drawing Sheets

INTERRUPT CONTROLLER UTILISING PROGRAMMABLE PRIORITY VALUES

BACKGROUND OF THE INVENTION

1. Field of the Invention

This invention relates to the field of data processing systems. More particularly, this invention relates to programmable interrupt controllers for use within data processing systems.

2. Description of the Prior Art

It is known to provide interrupt controllers which serve to receive interrupt signals from peripheral devices and arbitrate between these signals to determine which of the interrupt signals should be used to trigger associated interrupt driven processing. Arbitration may be required between interrupts which occur at the same time and/or arbitration may be used to allow one interrupt to pre-empt processing that is already being performed in response to an earlier interrupt. Priority values which may be programmed are associated with the different interrupts to manage the prioritisation between interrupt signals which arise.

It is known to use operating systems to program the priority values associated with different interrupts within an interrupt controller. This provides flexibility in the prioritisation associated with different interrupts. It would be normal for an operating system to control the priority values such that an interrupt signal associated with a high priority event would be given a high priority value. Thus, it would be preferred over a simultaneous interrupt of a lower priority or would be able to pre-empt existing processing which was associated with a lower priority interrupt.

A problem arises when additional capability is added to the system as a whole and to the interrupt handler in particular. As systems develop in functionality and complexity it is desirable to provide additional functionality in the interrupt controller. However, there is a legacy code base which it is desirable to still be able to support. Software and systems developed with earlier interrupt controllers should still be capable of using more advanced and more capable interrupt controllers, i.e. backwards compatibility is strongly desirable.

SUMMARY OF THE INVENTION

Viewed from one aspect the present invention provides an interrupt controller comprising:

a plurality of priority registers each operable to store a priority value associated with one or more interrupt signals of a plurality of interrupt signals;

a priority register accessing circuit operable to provide access to priority values stored within said plurality of priority registers; and a prioritising circuit operable when multiple interrupt signals are asserted to prioritise between said multiple interrupt signals in dependence upon respective priority values as stored in said plurality of priority registers; wherein said priority register accessing circuit is responsive to an access request received from a first priority value manager to apply a first mapping between priority values as accessed by said first priority value manager and priority values as stored in said plurality of priority registers; and said priority register accessing circuit is responsive to an access request received from a second priority value manager to apply a second mapping between priority values as accessed by said second priority value manager and priority values as stored in said plurality of priority registers, said second mapping being different to said first mapping.

The present technique recognises that an interrupt controller may be provided with a unified set of priority registers storing priority values associated with one or more interrupt signals. These priority values can be used to arbitrate between interrupt signals using a prioritising circuit to provide regular and predictable interrupt behaviour. A priority register accessing circuit is provided to allow access for both reads and writes to the priority registers from the systems responsible for managing the priority values stored therein. The present technique provides that the priority register accessing circuit provides at least two mappings between the priority values as stored within the priority registers and the priority value managers seeking to access those priority values. Thus, for example, a legacy operating system may be provided with a mapping to its priority values in accordance with a legacy configuration. A new operating system can then be provided with a different mapping to those same priority values, or a different set of priority values, in a way which enables the interrupt controller to prioritise interrupts arising based upon the priority values set by either priority value manager in a unified way and yet allow separate control over those priority values from respective managers.

It will be appreciated that the priority value managers could take a variety of forms and may, for example, be implemented in special purpose hardware used to set up priority registers. However, the present technique is particularly well suited to embodiments in which the first priority value manager is part of a first operating system and the second priority value manager is part of a second operating system.

In this context the present technique is particularly useful when the first priority value manager is operating within a secure domain having access to secure data and the second priority value manager is operating within a non-secure domain not having access to that secure data. The different mappings provided by the priority value accessing circuit enables the secure operating system to set its priority values associated with security sensitive interrupts at levels controlled only by that secure operating system such that the security of the system cannot be compromised by inappropriate priority value settings being made using the second non-secure operating system.

The division of the capabilities of the different priority value managers can be arranged in a variety of different ways. The first priority value manager and the second priority value manager may individually or both have exclusive values within the range of priority values that they may set. As an example, a secure operating system may have the exclusive ability to be able to set priority values of the highest priority level. In this way, a secure operating system managing a secure peripheral can ensure that a non-secure operating system managing a non-secure peripheral will not be able to set the priority value associated with that non-secure peripheral to a value where it will pre-empts or otherwise interferes with operation of the secure peripheral.

In some circumstances it may also be desirable that the priority value ranges that can be set by the first and second priority value managers overlap to at least some degree. As an example, a secure operating system may be managing the priority value associated with a peripheral which is not particularly security sensitive and it would make better overall use of the capabilities of the system if a non-secure operating system were able to set a priority value associated with one of its peripherals to be higher than the non-security sensitive peripheral being managed by the security operating system. An overlapping range of priority values which may be provided enables the non-secure operating system to use one of the highest priority values available to it, which will be above a priority value that can be set by the secure operating system for its non-security sensitive peripheral.

At one extreme, the first priority value manager may be able to set priority values to any of those which can be set by the second priority value manager if it so requires.

The above has been described in terms of a first and second priority value manager. It will be appreciated that the present technique is not limited to the provision of only two priority value managers and may be extended to cover multiple priority value managers, at least some of which have different mappings which are provided by the priority value accessing circuit for them to access priority values as stored in the priority value registers.

The mappings that are used can take a wide variety of different forms. As a particularly preferred example, one of the mappings may be direct with the other mapping applying a shift by one or more bit positions in one sense when writing and a shift in the opposite sense when reading. This is efficient and effective way of making a range of priority values accessible by only one of the managers.

A simple and preferred example is to right shift upon writing the priority value from a non-secure environment and shift in to its most significant bit position a value of "1" in situations where the lowest priority value corresponds to the highest priority level. Shifting in a "1" into the most significant bit position when writing in this way ensures that the non-secure systems are not able to access the lower half of the priority value range which is reserved to the secure systems. When reading from such priority registers a non-secure operating system will have its access left shifted by one bit position so that it reads the value which it wrote subject to a zero being written into the least significant bit position.

As an alternative embodiment which may be desirable in some other circumstances, the mappings may provide a numerical offset to priority values accessed by the first priority value manager with that offset being either added or subtracted upon writing with the complementary operation being performed upon reading.

The first priority value manager may additionally be capable of managing priority values on behalf of the second priority value manager. The first priority value manager may be a more advanced operating system which is effectively able to take over priority value management on behalf of a legacy operating system or on behalf of a non-secure domain as a whole.

As previously discussed, the priority values may be used to control whether an interrupt which arises pre-empts processing being performed in response to a previously occurring interrupt. It may be desirable that only a subset of the bits of a priority value are used in making such a determination as to whether or not pre-emption is permitted. Such a division of a priority value into bits which determine pre-emption and bits which do not determine pre-emption can be thought of by analogy as providing a decimal point position within the priority value with those bits below the decimal point not affecting pre-emption. When such a technique is employed, the programmable value which controls the selection of the bits which influence pre-emption should desirably also be subject to the first and second mapping depending upon the place from which it is accessed in order to provide the consistency of view appropriate to supporting legacy system.

Viewed from another aspect the present invention provides an interrupt controller comprising:

a plurality of priority register means each for storing a priority value associated with one or more interrupt signals of a plurality of interrupt signals;

a priority register accessing means for providing access to priority values stored within said plurality of priority registers; and a prioritising means for prioritising when multiple interrupt signals are asserted between said multiple interrupt signals in dependence upon respective priority values as stored in said plurality of priority register means; wherein said priority register accessing means is responsive to an access request received from a first priority value manager means to apply a first mapping between priority values as accessed by said first priority value manager means and priority values as stored in said plurality of priority register means; and said priority register accessing means is responsive to an access request received from a second priority value manager means to apply a second mapping between priority values as accessed by said second priority value manager means and priority values as stored in said plurality of priority register means, said second mapping being different to said first mapping.

Viewed from a further aspect the present invention provides a method of controlling interrupts comprising:

storing a priority value associated with one or more interrupt signals of a plurality of interrupt signals within respective ones of a plurality of priority registers; and when multiple interrupt signals are asserted, prioritising between said multiple interrupt signals in dependence upon respective priority values as stored in said plurality of priority registers; wherein in response to an access request received from a first priority value manager to applying a first mapping between priority values as accessed by said first priority value manager and priority values as stored in said plurality of priority registers; and in response to an access request received from a second priority value manager to applying a second mapping between priority values as accessed by said second priority value manager and priority values as stored in said plurality of priority registers, said second mapping being different to said first mapping.

Viewed from a further aspect the present invention provides a computer program product storing one or more computer programs for controlling a data processing apparatus including an interrupt controller having a plurality of priority registers each operable to store a priority value associated with one or more interrupt signals of a plurality of interrupt signals, said one or more computer programs comprising:

a first priority value manager operable to access said priority values stored in said plurality of priority registers using a first mapping between priority values as accessed by said first priority value manager and priority values as stored in said plurality of priority registers; and a second priority value manager operable to access said priority values stored in said plurality of priority registers using a second mapping between priority values as accessed by said second priority value manager and priority values as stored in said plurality of priority registers, said second mapping being different to said first mapping.

The computer program product may be considered as to the total programming of a system which incorporates multiple priority value managers each utilising their respective mapping between priority values as accessed by themselves and as stored in the priority registers.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
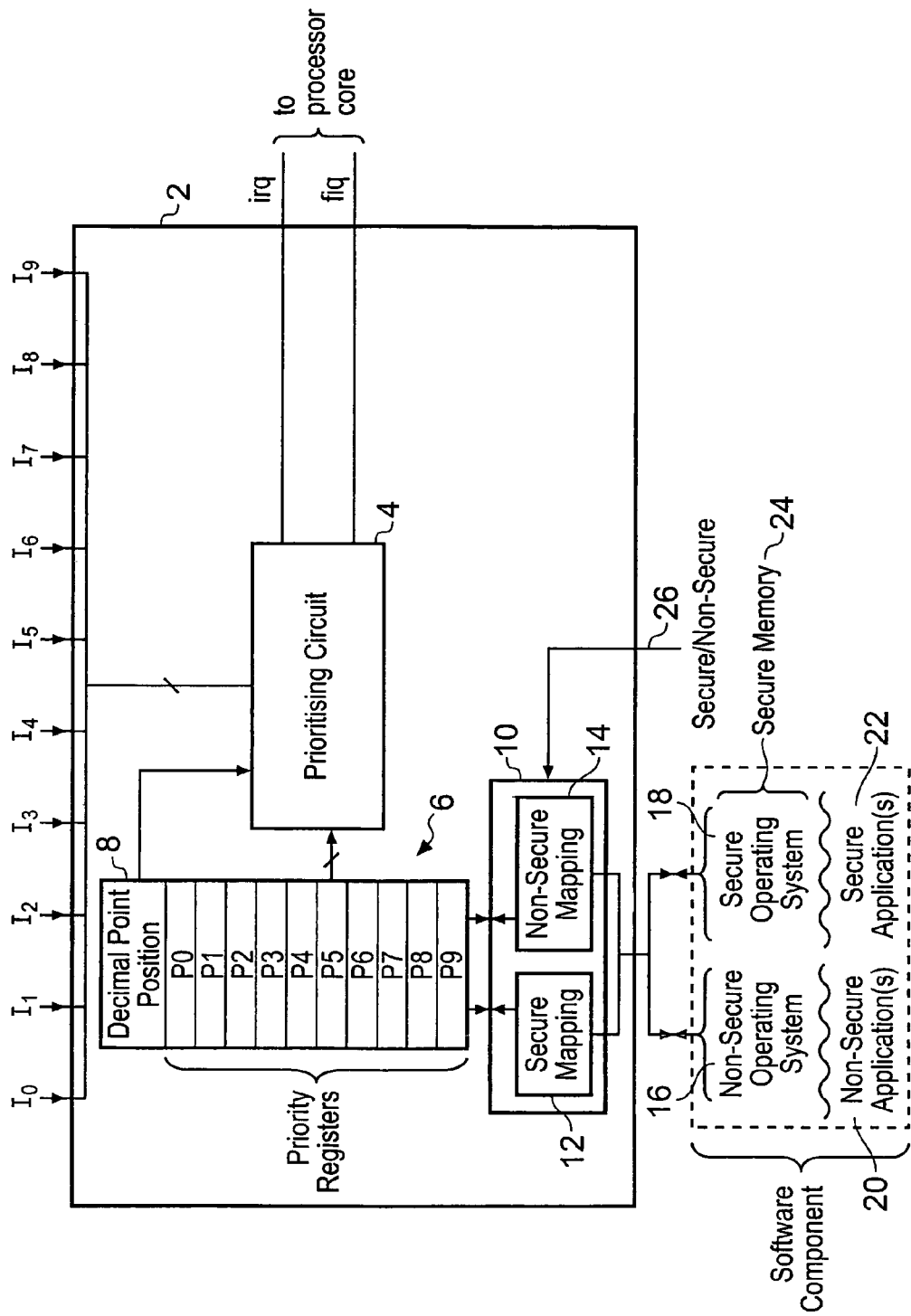
FIG. 1 schematically illustrates an interrupt controller storing priority values which are accessed by a first priority value manager and a second priority value manager.

FIG. 1 shows an interrupt controller 2 receiving ten interrupt signals $I_0$-$I_9$ into a prioritising circuit 4 and generating a slow interrupt signal irq and a fast interrupt signal fiq passed to a processor core in response thereto. Priority values stored within corresponding priority registers 6 are supplied to the prioritising circuit 4 to allow it to arbitrate between different interrupts $I_0$-$I_9$ that are received. In this example, a dedicated priority register with a dedicated priority register value is associated with each separate interrupt. However, it is possible that a single priority value might be mapped to multiple interrupt signals, or some other mapping provided. A decimal point position register 8 (actually a binary point) is programmable and serves to select a subset of bits within the priority values which are used to control pre-emption between interrupts. A priority value accessing circuit 10 is provided to give read access and write access to the priority registers 6 and the decimal point position register 8. This priority value accessing circuit 10 includes secure mapping hardware 12 and non-secure mapping hardware 14 for respective use by a secure operating system 18 and a non-secure operating system 16. These operating systems 16, 18 have respective application programs 20, 22 which execute using those operating systems 16, 18. The secure operating system 18 has access to secure memory 24 which is not accessible to the non-secure operating system 16 and the non-secure applications 20. A secure domain signal 26 is input to the priority value accessing circuit 10 and indicates the current security domain in which the system as a whole is operating and accordingly selects either the secure mapping circuit 12 or the non-secure mapping circuit 14 to be used for accesses directed through the priority value accessing circuit 10. The secure domain signal could also be replaced by (or generated from) an address signal line or an address decoded area.

Figure 2:
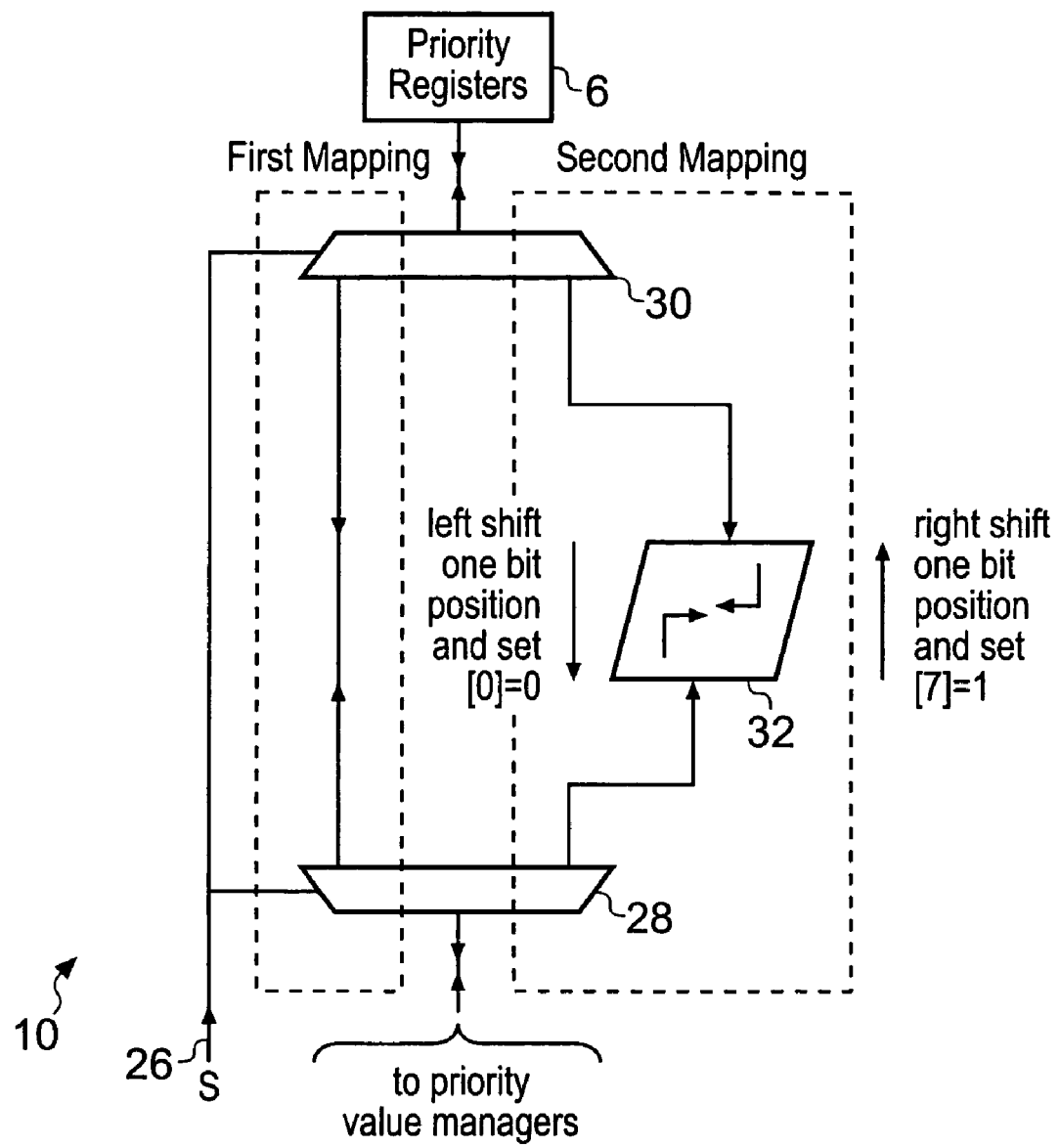
FIG. 2 schematically illustrates a first example of a priority value accessing circuit.

FIG. 2 schematically illustrates a first example of a priority value accessing circuit 10. In this example, the first mapping is direct and the second mapping applies a right shift upon a write with a most significant bit being set to 1 in the priority value as written, and a left shift upon reading with a least significant bit being set to zero in the priority value as read. In more detail, multiplexers 28, 30 are controlled by the secure domain signal 26 to select either the first mapping or the second mapping. The second mapping takes place through a shifter circuit 32. The input to the multiplexer 28 from outside of the priority value accessing circuit 10 is from the priority value managers formed by the non-secure operating system 16 and/or the secure operating system 18. The priority registers 6 are coupled to the second multiplexer 30.

The decimal point position register 8 holds a 3-bit value specifying a binary point position in the range 0-7 where the binary point lies within an 8-bit priority value. A different mapping is required compared to the priority values themselves. A hardware incrementer may be used to move the binary point to the left when reading the value from register 8 with non-secure software. In this way secure software sees the actual binary point register value and the non-secure software sees the binary point value incremented by one (where decreasing the binary point value shifts to the right). The modified binary point values saturate at 0 and 7.

Figure 3:
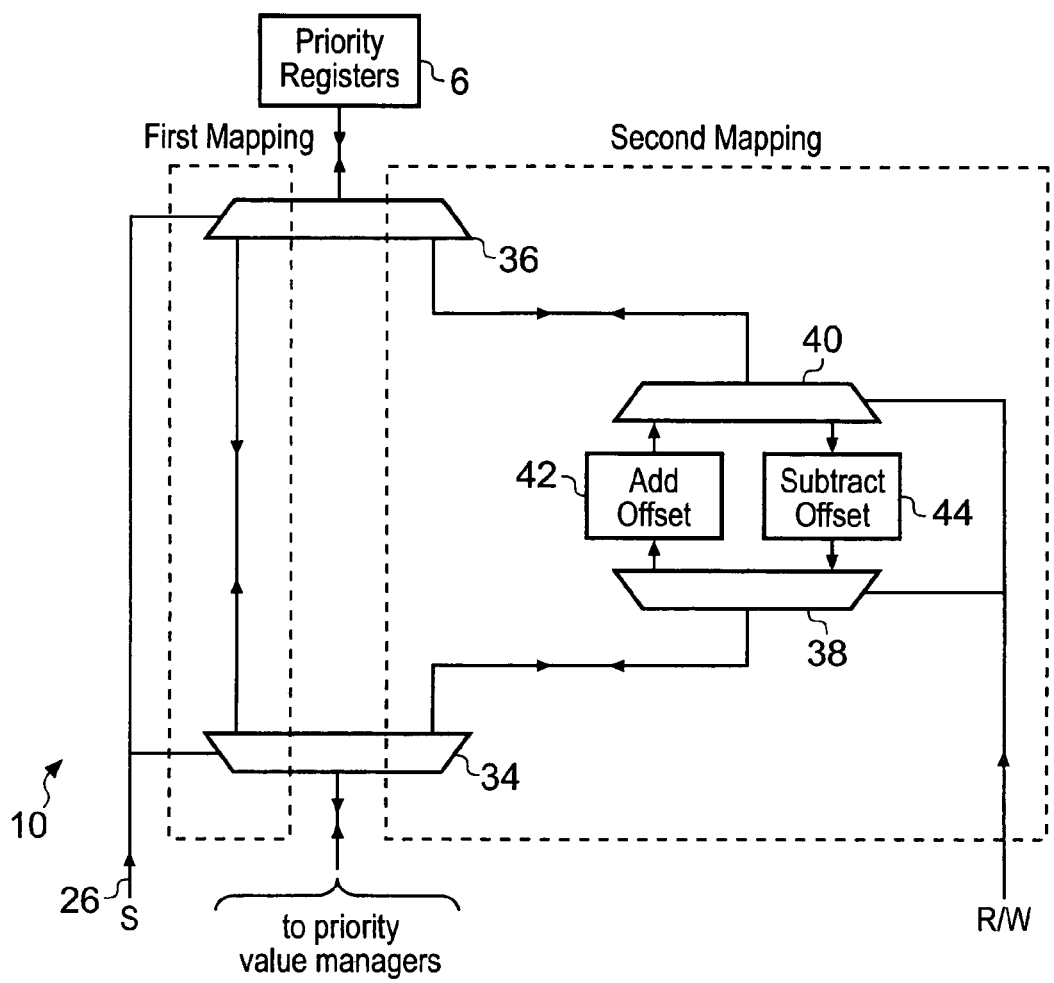
FIG. 3 schematically illustrates a second example of a priority value accessing circuit.

FIG. 3 illustrates a second example of a plurality value accessing circuit 10. In this case, the multiplexers 34, 36 switch by the secure domain signal 26 selectively apply a first mapping which is direct or a second mapping which adds an offset to the priority value when writing to the priority registers 6 and subtracts an offset from the priority value when reading from the priority value registers 6. Multiplexers 38, 40 switched by a read/write signal place an adder circuit 42 or a subtracting circuit 44 into the priority value path for selectively either adding an offset value or subtracting an offset value as that priority value passes.

Figure 4:
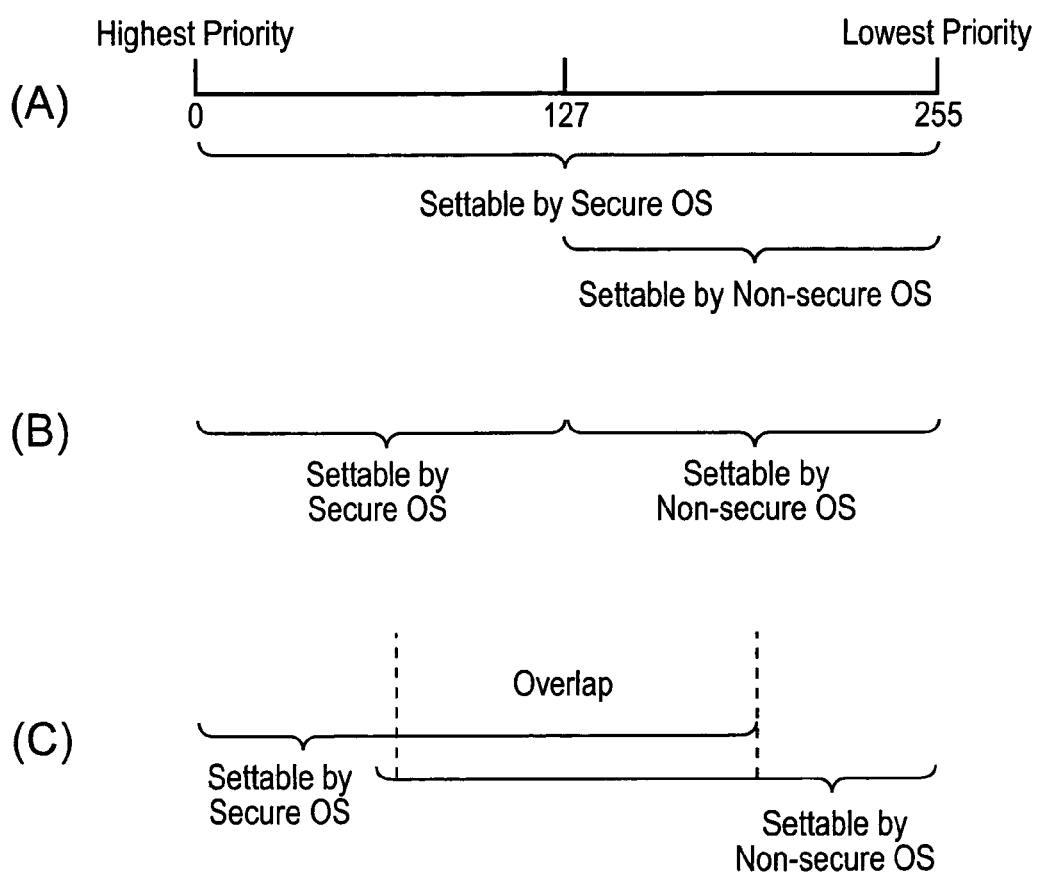
FIG. 4 schematically illustrates a variety of possible relationships between the priority values which may be set by respective priority value managers.

FIG. 4 schematically illustrates three examples, A, B and C, of priority values as stored in the priority registers 6. In these examples the priority values are 8-bit values and the lowest priority values correspond to the highest priority levels. In example A, all priority values are accessible and settable by the secure operating system 18. Conversely, only the priority values extending from 128 to 255 are accessible and settable by the non-secure operating system 16. This example roughly corresponds to the right/left shift mapping as discussed in relation to FIG. 2.

Example B shows the situation in which the priority values 0 to 127 are exclusively accessible via the secure operating system 18, whilst the priority values 128 to 255 are exclusively settable by the non-secure operating system 16. This example could be achieved by applying a numeric offset of FIG. 3, or in other ways.

Example C is one in which there is an overlap of priority values which are settable by both the secure operating system 18 and the non-secure operating system 16. Both operating systems 18, 16 also have exclusive access to their own range of priority values as is shown. The offset mapping of FIG. 3 could be used to provide this result.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An interrupt controller comprising:
   a plurality of priority registers each configured to store a priority value associated with one or more interrupt signals of a plurality of interrupt signals;
   a priority register accessing circuit configured to provide access to priority values stored within said plurality of priority registers; and
   a prioritising circuit configured, when multiple interrupt signals are asserted, to prioritise between said multiple interrupt signals in dependence upon respective priority values as stored in said plurality of priority registers; wherein said priority register accessing circuit is responsive to an access request received from a first priority value manager to apply a first mapping between priority values as accessed by said first priority value manager and priority values as stored in said plurality of priority registers; and said priority register accessing circuit is responsive to an access request received from a second priority value manager to apply a second mapping between priority values as accessed by said second priority value manager and priority values as stored in said plurality of priority registers, said second mapping being different to said first mapping.

2. An interrupt controller as claimed in claim 1, wherein said first priority value manager is part of a first operating system.

3. An interrupt controller as claimed in claim 1, wherein said second priority value manager is part of a second operating system.

4. An interrupt controller as claimed in claim 1, wherein said first priority value manager operates within a secure domain having access to secure data and said second priority value manager operates within a non-secure domain not having access to said secure data.

5. An interrupt controller as claimed in claim 1, wherein said first mapping is such that said first priority value manager is able to set said priority values as stored by said priority registers to one or more first mapping-exclusive values that cannot be set by said second priority value manager using said second mapping.

6. An interrupt controller as claimed in claim 1, wherein said second mapping is such that said second priority value manager is able to set said priority values as stored by said priority registers to one or more second mapping-exclusive values that cannot be set by said first priority value manager using said first mapping.

7. An interrupt controller as claimed in claim 6, wherein said second mapping is such that said second priority value manager is able to set said priority values as stored by said priority registers to one or more second mapping-nonexclusive values that can also be set by said first priority value manager using said first mapping.

8. An interrupt controller as claimed in claim 1, wherein said second mapping is such that said second priority value manager is able to set said priority values as stored by said priority registers to values that can all also be set by said first priority value manager using said first mapping.

9. An interrupt controller as claimed in claim 5, wherein said first mapping-exclusive values have a higher priority than any priority values that can be set by said second priority value manager.

10. An interrupt controller as claimed in claim 1, wherein said first mapping directly maps bits values as stored by said priority registers to bit values as accessed by said first priority value manager.

11. An interrupt controller as claimed in claim 1, wherein said second mapping maps bits values as stored by said priority registers to shifted bit positions within bit values as accessed by said first priority value manager.

12. An interrupt controller as claimed in claim 11, wherein when said second priority value manager is writing to a priority register, said priority register accessing circuit applies said second mapping to right shift said priority value before said priority value is stored in a priority register.

13. An interrupt controller as claimed in claim 12, wherein said right shift is by one bit position.

14. An interrupt controller as claimed in claim 13, wherein a most significant bit of said priority value as stored in said priority register is set to 1.

15. An interrupt controller as claimed in claim 11, wherein when said second priority value manager is reading from a priority register, said priority register accessing circuit applies said second mapping to left shift said priority value before said priority value is stored in a priority register.

16. An interrupt controller as claimed in claim 15, wherein said left shift is by one bit position.

17. An interrupt controller as claimed in claim 16, wherein a least significant bit of said priority value as stored in said priority register is set to 0.

18. An interrupt controller as claimed in claim 1, wherein said second mapping maps priority values as stored by said priority registers to offset priority values as accessed by said first priority value manager.

19. An interrupt controller as claimed in claim 18, wherein when said second priority value manager is writing to a priority register, said priority register accessing circuit applies said second mapping to add an offset value to said priority value before said priority value is stored in a priority register.

20. An interrupt controller as claimed in claim 18, wherein when said second priority value manager is reading from a priority register, said priority register accessing circuit applies said second mapping to subtract an offset value from said priority value before said priority value is stored in a priority register.

21. An interrupt controller as claimed in claim 1, wherein said first priority value manager manages priority values on behalf of said second priority value manager.

22. An interrupt controller as claimed in claim 1, wherein when processing is being performed associated with a first interrupt signal associated with a first priority value and a second interrupt signal associated with a second priority value is asserted, if said second priority value corresponds to a higher priority than said first priority value, then said prioritising circuit is operable to trigger interruption of said processing associated with said first interrupt signal and starting of processing associated with said second interrupt signal.

23. An interrupt controller as claimed in claim 22, wherein a programmable value controls selects a set of bits of said first priority value and said second priority value to compare to determine if said second priority value corresponds to a higher priority, said programmable value, said set of bit also being subject to said first mapping and said second mapping.

24. An interrupt controller comprising:
a plurality of priority register means each for storing a priority value associated with one or more interrupt signals of a plurality of interrupt signals;
a priority register accessing means for providing access to priority values stored within said plurality of priority registers; and
a prioritising means for prioritising when multiple interrupt signals are asserted between said multiple interrupt signals in dependence upon respective priority values as stored in said plurality of priority register means; wherein
said priority register accessing means is responsive to an access request received from a first priority value manager means to apply a first mapping between priority values as accessed by said first priority value manager means and priority values as stored in said plurality of priority register means; and
said priority register accessing means is responsive to an access request received from a second priority value manager means to apply a second mapping between priority values as accessed by said second priority value manager means and priority values as stored in said plurality of priority register means, said second mapping being different to said first mapping.

25. A method of controlling interrupts comprising:

storing a priority value associated with one or more interrupt signals of a plurality of interrupt signals within respective ones of a plurality of priority registers; and when multiple interrupt signals are asserted, prioritising between said multiple interrupt signals in dependence upon respective priority values as stored in said plurality of priority registers; wherein in response to an access request received from a first priority value manager to applying a first mapping between priority values as accessed by said first priority value manager and priority values as stored in said plurality of priority registers; and in response to an access request received from a second priority value manager to applying a second mapping between priority values as accessed by said second priority value manager and priority values as stored in said plurality of priority registers, said second mapping being different to said first mapping.

26. A computer program product comprising a computer readable storage medium storing one or more computer programs for controlling a data processing apparatus including an interrupt controller having a plurality of priority registers each operable to store a priority value associated with one or more interrupt signals of a plurality of interrupt signals, said one or more computer programs comprising:

a first priority value manager configured to access said priority values stored in said plurality of priority registers using a first mapping between priority values as accessed by said first priority value manager and priority values as stored in said plurality of priority registers; and a second priority value manager configured to access said priority values stored in said plurality of priority registers using a second mapping between priority values as accessed by said second priority value manager and priority values as stored in said plurality of priority registers, said second mapping being different to said first mapping.

27. A computer program product as claimed in claim 26, wherein said first priority value manager is part of a first operating system.

28. A computer program product as claimed in claim 26, wherein said second priority value manager is part of a second operating system.

29. A computer program product as claimed in claim 26, wherein said first priority value manager operates within a secure domain having access to secure data and said second priority value manager operates within a non-secure domain not having access to said secure data.

* * * * *